United States Patent [19]
Brandstetter

[11] Patent Number: 5,103,324
[45] Date of Patent: Apr. 7, 1992

[54] METHOD FOR FABRICATING HOLOGRAPHIC FILTERS

[75] Inventor: Robert W. Brandstetter, Levittown, N.Y.

[73] Assignee: Grumman Aerospace Corporation, Bethpage, N.Y.

[21] Appl. No.: 526,661

[22] Filed: May 22, 1990

[51] Int. Cl.$^5$ .................. G02B 5/32; G02B 5/18; G03H 1/08

[52] U.S. Cl. .................. 359/9; 359/15; 359/29; 359/568; 359/569

[58] Field of Search .................. 350/3.66, 3.6, 3.7, 350/3.61, 3.82, 162.11, 162.12, 162.13, 162.17, 162.2

[56] References Cited

U.S. PATENT DOCUMENTS

| | | | |
|---|---|---|---|
| 4,421,379 | 12/1983 | Grumet et al. | 350/3.72 |
| 4,597,630 | 7/1986 | Brandstetter et al. | 350/3.83 |
| 4,699,466 | 10/1987 | Brandstetter et al. | 350/162.12 |

OTHER PUBLICATIONS

Nagashima, K. and Asakura, T., "Computer-Generated Line Holograms Using an XY Plotter", *Optics and Laser Technology*, vol. 15, No. 3, pp. 133–137.

Nagashima, K. and Asakura, T., "Simple Computer-Generated Holograms Displayed by an X-Y Plotter", *Optics and Laser Technology*, vol. 10, No. 6, Dec. 1978, pp. 310–312.

Freude et al., "Computer-Generated Holograms with Error Compensations", *Applied Optics*, vol. 27, No. 1, Jan. 1, 1988, pp. 138–146.

Fowles, *Introduction to Modern Optics*, 2nd Edition, 1975, pp. 135–147.

Simpson, *Introductory Electronics for Scientists and Engineers*, 1974, pp. 84–97.

*McGraw-Hill Encyclopedia of Science & Technology*, 6th Edition, 1987, vol. 7, pp. 387–391.

Primary Examiner—Bruce Y. Arnold
Assistant Examiner—David R. Parsons
Attorney, Agent, or Firm—Bacon & Thomas

[57] ABSTRACT

A method for generating holographic optical elements such as power spectrum filters is carried out using a printer and a computer. A signal function is input into the computer and traced by the printer to produce a power spectrum envelope of the signal function. The power spectrum is then filled in with a grating pattern whose line spacing is determined by the desired diffraction of coherent radiation beams used to interrogate the optical element.

9 Claims, 3 Drawing Sheets

METHOD FOR FABRICATING HOLOGRAPHIC FILTERS

BACKGROUND OF THE INVENTION

I. Field of the Invention.

This invention relates to the manufacture of holographic optical elements, and in particular to the manufacture of holographic filters of the type used in connection with the spectral sorting and classification of radio frequency signals and the detection and removal of noise and unwanted frequencies from those signals.

II. Description of Related Art.

1. Uses for Holographic Filters.

Holographic filters are useful in a variety of applications involving analysis of information-carrying beams of light. The application described below involves use of holographic filters to analyze signals of interest in the radio frequency band.

In the field of radio frequency signal processing, it is known to modulate the signal of interest onto a carrier laser beam for subsequent processing. Spectral sorting and filtering of the beam can then be accomplished at essentially the speed of light by optical techniques.

Acousto-optic modulator devices for modulating the radio frequency signals onto the carrier laser beam are well known. Such modulators work by transforming a radio frequency signal into an acoustic wave which modulates the refractive index of an optical material, through the use of a piezo-electric crystal transducer causing compressions and rarefactions in the medium that are periodic with the radio frequency signal.

The modulated medium appears to an incident laser beam as a dynamic phase grating which shifts the frequency of the carrier by an amount proportional to the radio frequency of the signal of interest. Such an acousto-optic modulator is described in U.S. Pat. No. 4,699,466. Other types of acousto-optic modulators are also known to those skilled in the art.

The resultant modulated carrier beam is then Fourier transformed using an appropriate lens such as the lens described in U.S. Pat. No. 4,421,379. The lens described in U.S. Pat. No. 4,421,379 converts the modulated carrier beam into the Fourier frequency domain. The reason that the modulated beam is transformed into the frequency domain is that the Fourier transform of a signal is essentially a model of the signal waveform spectra over all time, and therefore permits evaluation of every signal frequency that may be present in the beam.

Once the carrier beam has been modulated together with the radio frequency signal of interest, and converted into the Fourier frequency domain, the radio frequency signal may then be analyzed for the presence of particular frequencies. For this purpose, a holographic filter is used which separates the frequencies of interest from the remainder of the Fourier separated frequencies, as illustrated in FIG. 1.

The holographic filter 2 shown in FIG. 1 is essentially a set of interference fringe patterns 1 having a line spacing S. Using principles of diffraction, only components of those frequencies f1 to fn in the signal of interest which coincide with a unique fringe pattern in the filter, i.e., the correlated spectra 3, will be diffracted. The remainder of the laser beam passes through the filter as uncorrelated spectra 4 without diffraction. The uncorrelated spectra 4 also contains the zero order of grating 2.

Once the optically modulated laser beam has been correlated by selectively diffracting specific frequencies in the signal of interest, the correlated spectrum may then be analyzed, recorded, or monitored. Also, a "correlation function" for the signal of interest may be developed. The correlated spectrum may, finally, be converted back to the time domain by an inverse Fourier transform, and subsequently demodulated to recover the original signal of interest for retransmission or additional data processsing.

Although one known use of a holographic filter has been described above, it will be recognized that holographic filters may have other applications, such as optical beam switching and in the fields of image processing or character recognition.

2. Disadvantages of Conventional Holographic Filters.

The primary disadvanatage of holographic filters is the complexity of creating holographic recordings for use in the filters. Formation of a hologram has previously been understood to require the interference of two coherent light beams, and the optical recording of the resultant interference pattern.

Such a system is described, for example, in U.S. Pat. No. 4,597,630. The system described in U.S. Pat. No. 4,597,630 splits a single coherent light beam such as a laser beam which has been phase modulated with a radio frequency signal using an acousto-optic modulator. One of the beams is used as the signal-carrying object beam and the other beam is a self-derived reference beam. The two beams are caused to interfere and the resultant interference pattern is recorded by a photo-optical element or medium.

While the system of U.S. Pat. No. 4,597,630 has proved successful, the difficulties inherent in the process are illustrated by the conditions necessary to create a recordable interference pattern. First, both the object and reference beams must have the same frequency and wavelength. Second, the phase difference between the waves at a given point must not vary in time. Third, the relative amplitude of the two signals must be fixed. Fourth, the light signals must have the same polarization. Finally, the path difference between the signals must be within the coherent length of the source laser beam.

The system of U.S. Pat. No. 4,597,630 clearly meets these conditions, but it would nevertheless be advantageous to create holographic filters which are suitable for applications such as the above-described RF spectra correlation and which do not require the meeting of these conditions.

SUMMARY OF THE INVENTION

It is an object of the invention to overcome the above-described disadvantages of the prior art by providing a method of generating holographic optical elements, for example filters, which does not require optical holographic recording techniques.

It is further object of the invention to provide a method of generating holographic optical elements according to which an ideal interference pattern may be generated.

It is still further object of the invention to provide method of generating a power spectrum hologram filters which does not require optical recording techniques.

These objects are achieved by generating a computer model of a desired signal function, plotting the signal function by using a high resolution printer, and generating a diffractive interference pattern by printing a diffraction grating within the plotted signal function.

In a preferred embodiment of the invention, the desired signal function is a radio frequency power spectrum which is traced using a high resolution printer. The diffraction grating is subsequently printed within the spectral lobes of the power spectrum envelope.

The resulting holographic filter may be printed directly onto a transparency for use as filter, or it may be printed onto an opaque medium for subsequent copying onto a transparency.

The line spacing of the interference fringe pattern itself may be controlled to vary the amount of separation achieved by the filter, including variation in the diffraction gratings from lobe to lobe in order to control the spatial distribution of the readout. By changing the shape of the signal function, variable threshholding of the spectral component can be accomplished to sharpen the filter response and remove unwanted spectra from falling within the lobe.

DETAILED DESCRIPTION OF THE PREFERRED EMBODIMENTS

Figure 1:
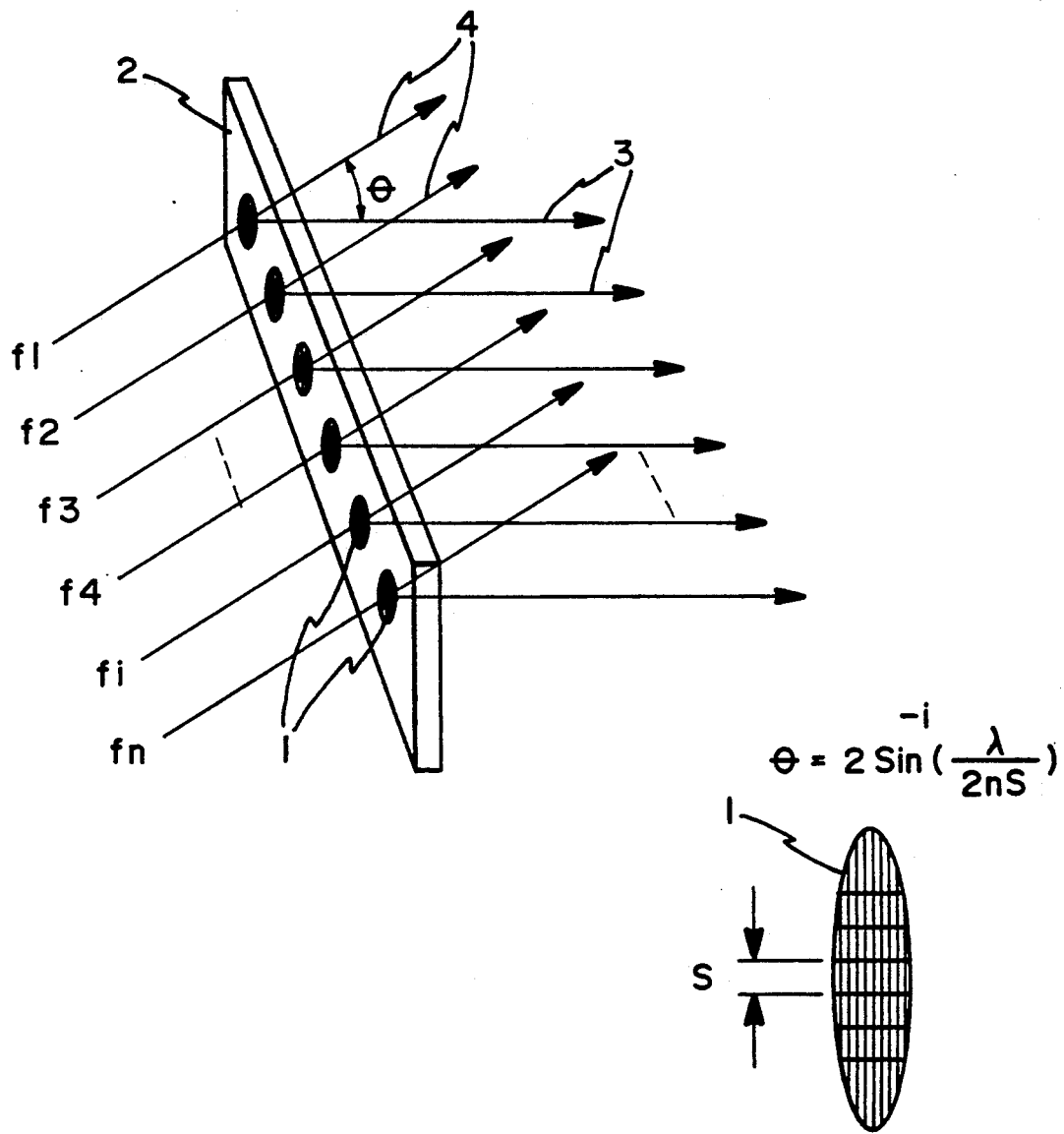
FIG. 1 illustrates the manner in which the holographic filter of the invention may be used.
Figure 2:
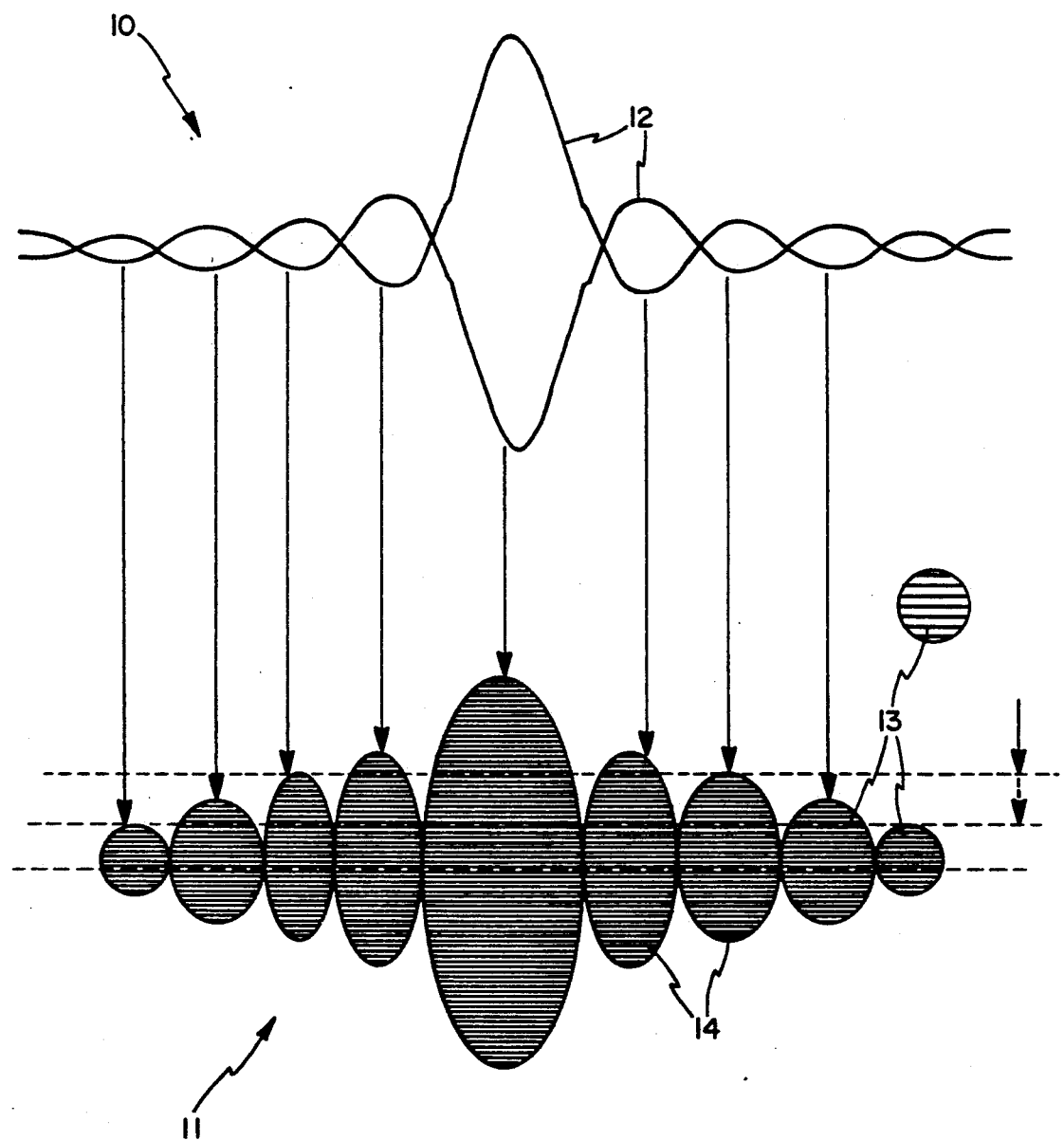
FIG. 2 illustrates a computer generated power spectrum according to a preferred embodiment of the invention.
Figure 3:
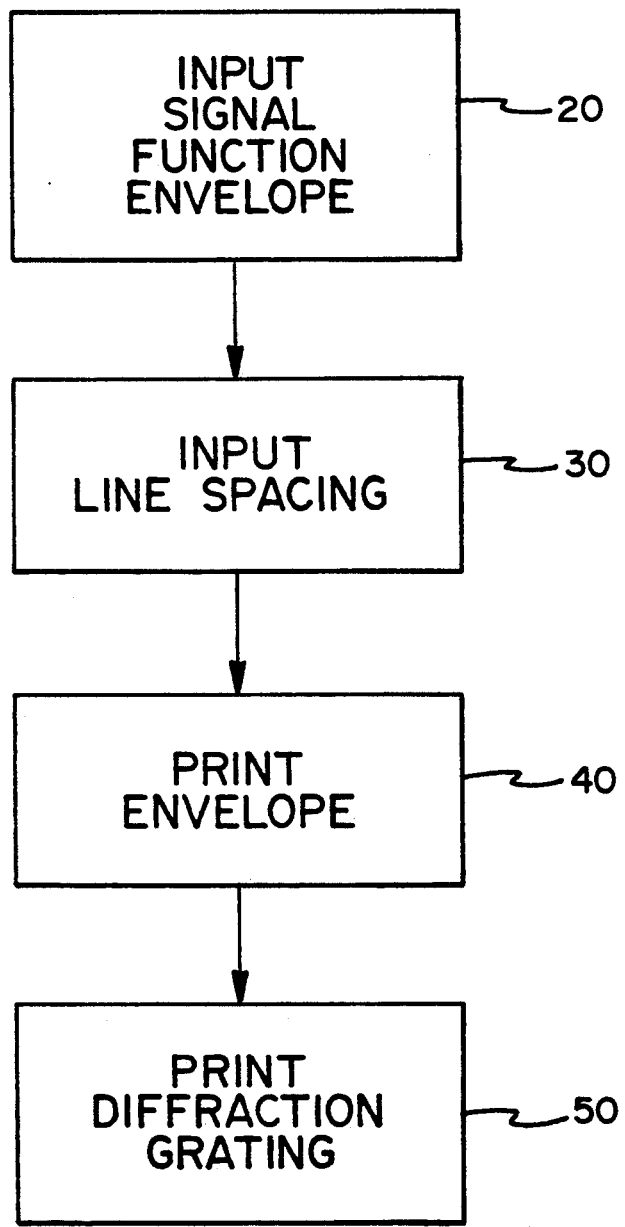
FIG. 3 is a flow chart of a method of making a holographic filter in accordance with the principles of a preferred embodiment of the invention.

FIG. 2 is a representation of the signal function of a pulse modulated signal 10 and a corresponding power spectrum 11, including gratings 13 generated according to the method of a preferred embodiment of the invention. The steps of the method are illustrated in the flow chart of FIG. 3.

The "signal function" simulates a frequency domain transformed carrier radiation beam which has been modulated by a radio frequency signal of interest in a device such as the acousto-optic modulator described above. Although the acousto-optic modulator is still necessary to create a filter interrogation beam, the present invention eliminates the need for such a device, and all of the other complex optical apparatus, previously thought necessary to create the holographic filter.

The method of the invention may be practiced on any computer or other electronic device capable of controlling a printer in order to plot or trace a function input into the computer onto a sheet of paper or a transparency. Numerous appropriate computers, including microcomputers, are commercially available, as is the software necessary to enable input of the signal and grating functions and generate printer control instructions.

The printer itself is preferably a high resolution printer such as a laser printer, although it will be appreciated that other graphic printers such as dot matrix printers, thermal printers, or ink jet printers may be used to practice the invention.

In one preferred embodiment, the resulting hologram is printed onto an ordinary opaque medium such as a sheet of paper for subsequent copying onto a transparent medium. Standard "view graph" material can be used as a transparent medium. Alternatively, the hologram may be printed directly onto the transparent medium.

The apparatus used in the invention, a computer, a printer, and a medium onto which the hologram is printed, is as noted above familiar to those skilled in the art. These elements may be used to create optical elements without the need for complex optical holographic recording techniques, as follows:

The first step 20 in practicing the preferred method is to input a desired signal function into the computer or printer controlling device. The hologram of a pulse modulated signal is initially expressed in terms of a signal function $G(\omega)$, the Fourier coefficient in the well known formula for transforming a time domain signal $v(t)$ into the frequency domain. In general, the Fourier transform of $v(t)$ is expressed as $$G(\omega) = \frac{1}{\sqrt{2\pi}} \int_{-\infty}^{\infty} v(t) e^{j\omega t} dt \qquad (1)$$

where $\omega$ is the Radian frequency of the signal, and is equal to $2\pi$ divided by the period of the signal.

For a square pulse, $v(t)$ equals the amplitude of the pulse, V, for a time t over the interval from zero to the pulse width T, and zero outside the interval. Substituting for $v(t)$ in equation (1), one arrives at the signal function for a pulse modulated signal:

$$G(\omega) = A\tau \left[ \frac{\sin\left(\frac{\omega\tau}{2}\right)}{\frac{\omega\tau}{2}} \right] \qquad (2)$$

where A equals $v/2\pi$. Because of the way that the pulse is defined, $G(\omega)$ is a real number.

The power spectrum of this function is obtained by squaring the magnitude of $G(\omega)$:

$$P(\omega) = |G(\omega)|^2 = \left| A\tau \left[ \frac{\sin\left(\frac{\omega\tau}{2}\right)}{\frac{\omega\tau}{2}} \right] \right|^2 \qquad (3)$$

A more general form of equation (3), which is applicable to any modulated carrier $v(t)$ for pulse, CW, and spread spectrum signals and in general for all cases, is:

$$F[G(\omega)] = \eta |G(\omega)|^2 = \eta \left| \frac{1}{\sqrt{2\pi}} \int_{-\infty}^{\infty} v(t) e^{j\omega t} dt \right|^2 \qquad (4)$$

where $\eta$ is a scaling function.

Graphs of an exemplary signal function $G(\omega)$ and its power spectrum envelope $P(\omega)$ are respectively indicated by reference numerals 12 and 14 in FIG. 2. The shapes of lines 12 and 14 will of course vary depending on the values of the variables in equations (2) and (3). Once the signal function for the power spectrum has been input into the computer, it will be plotted or traced by a high resolution printer onto a suitable medium as indicated by step 40 in FIG. 3.

It should be emphasized here that the above description of the signal function is not intended to be limiting, and that other types of holographic filters may be created by the method of the invention. For example, equation (1) may be used to create power spectra for radio frequency signals which are modulated by a method other than pulse modulation onto the carrier light beam.

The next step 30 after inputting the signal function is to add the grating pattern. The interference pattern is arrived at by using the known formula for calculating the relationship between the spacing S of a diffraction grating and the angular separation of the diffracted light beams. This formula is $$S = \lambda / \left( 2n\sin\frac{\theta}{2} \right) \quad (5)$$

In equation 4, $\lambda$ is the wave length of the coherent radiation beam which will be used to interrogate the filter and $\eta$ is the index of refraction of the filter, which depends upon the type of transparent material which will be used for the filter. The angle $\theta$ depends on the desired diffraction angle of the correlated spectra which emerges from the filter upon interogation, and is the angle of incidence of the interrogation beam.

The grating pattern simulates the effect of two interfering coherent laser beams such as the signal-carrying and self-derived reference beams described in U.S. Pat. No. 4,597,630. However, it is possible to vary $\theta$ simply by changing the spacing of the lines generated by the printer within the lobes of the pulse spectrum envelope. This would be very difficult using the process described in U.S. Pat. No. 4,597,630.

Once a grating pattern is input, as indicated in FIG. 3A, the printer under the control of the computer may then fill in the lobes with a desired grating according to the chosen spatial distribution of the correlated spectra, as indicated by step 50. It will of course be appreciated that the line spacing may also be input after printing of the signal function commences.

An advantage of the preferred embodiment is that it is possible to vary the spatial distribution of the read-out of the power spectrum from lobe to lobe by changing the line spacing within the lobes so that the diffraction angle varies from lobe to lobe. This makes possible use of the filter in a variety of multi-channel filter architectures and as optical switching elements in an optical computer. In addition, the vertical position and shape of the power spectrum envelope may be varied to sharpen the filter response and remove unwanted spectra in the interrogating beam resulting from noise or background which otherwise might fall within the lobe structure.

Another advantage of the preferred method is that the holographic pattern printed on the filter is itself an "ideal" pattern, unaffected by noise and unwanted spectra. Not only is the method of the invention less complex than alternative optical methods, the resulting filters or optical elements may, for many purposes, be superior to optically produced optical elements.

As is apparent from the above description, the holographic filter can be generated without the need for holographic interference pattern generating equipment or optical media. By simply inputting the signal function into the computer and using known graphic programs to cause the printer to trace the function, an effective power spectrum filter is generated. Furthermore, it is possible to generate signal functions other than the pulse function of the preferred embodiment. Using formula (2), virtually any type of signal function can be approximated and converted into a hologram. Finally, it is also possible to print multiple power spectra or other signal function onto the medium.

The printed filter operates in exactly the same manner as an optically generated filter. With a sufficiently high resolution printer, it is possible to achieve correlated and uncorrelated beam separations of, for example, forty millimeters at one meter from the filter and four millimeters at ten centimeters from the filter, the results of a line spacing of forty lines per millimeter.

Although what has been described is believed to be the best mode for practicing the invention, the invention is of course not to be limited by the above-description, but rather should be constructed to encompass all modifications that fall within the scope of the appended claims.

I claim:

1. A method for generating holographic optical elements, comprising the steps of:
   (a) using a printer to trace an envelope of a signal function F onto a medium; and
   (b) using a printer to fill in said envelope with a grating pattern having a spacing S between line of the grating pattern.

2. A method as claimed in claim 1, wherein F is a function of $G(\omega)$ and:

$$G(\omega) = \frac{1}{\sqrt{2\pi}} \int_{-\infty}^{\infty} v(t)\, e^{j\omega t}\, dt$$

where $\omega$ is a Radian frequency of a signal and a signal spectra is given by v(t).

3. A method as claimed in claim 2, wherein $$F[G(\omega)] = \eta\, |G(\omega)|^2 = \eta \left| \frac{1}{\sqrt{2\pi}} \int_{-\infty}^{\infty} v(t)\, e^{j\omega t}\, dt \right|^2$$

where $\eta$ is a scaling function and $\omega$ is the carrier frequency.

4. A method as claimed in claim 2, wherein v(t) describes a pulse modulated signal and $$F[G(\omega)] = \eta\, |G(\omega)|^2 = \eta \left| A\tau \left( \frac{\sin\left(\frac{\omega\tau}{2}\right)}{\frac{\omega\tau}{2}} \right) \right|^2$$

where $\eta$ is a scaling function, A is proportional to the amplitude of the pulse, T is the pulse duration, and $\omega$ is the pulse modulated carrier frequency.

5. A method as claimed in claim 1, wherein said printer is a laser printer controlled by a computer, and step (a) comprises the step of inputting said function F into said computer.

6. A method as claimed in claim 5, wherein said spacing S is determined by the formula $$S = \lambda / \left( 2n\sin\frac{\theta}{2} \right)$$

where λ is a wavelength of the light used to interrogate the filter, $\theta$ is the diffraction angle, and $\eta$ is the index of refraction of the transparent medium.

7. A method as claimed in claim 1, wherein said medium is opaque and said method further comprises the step of copying the printed pattern onto a transparent medium.

8. A method as claimed in claim 7, wherein said spacing S is determined by the formula $$S = \lambda / \left( 2n\sin\frac{\theta}{2} \right)$$

where λ is a wavelength of the light used to interrogate the filter, $\theta$ is the diffraction angle, and $\eta$ is the index of refraction of the transparent medium.

9. A method as claimed in claim 1, wherein said medium is transparent.

* * * * *